United States Patent [19]

Tezuka et al.

[11] Patent Number: 5,600,618
[45] Date of Patent: Feb. 4, 1997

[54] OPTICAL DATA RECORDING/REPRODUCING DEVICE AND INTEGRATED HEAD

[75] Inventors: Koichi Tezuka; Kyoko Miyabe, both of Kawasaki, Japan

[73] Assignee: Fujitsu Limited, Japan

[21] Appl. No.: 416,044

[22] Filed: Apr. 4, 1995

[30] Foreign Application Priority Data

Jul. 15, 1994 [JP] Japan .................................. 6-164383

[51] Int. Cl.[6] ....................................... G11B 7/00
[52] U.S. Cl. ........................ 369/112; 369/109; 369/103; 369/105; 369/44.41
[58] Field of Search ...................... 369/112, 110, 369/103, 105, 44.12, 44.23, 44.41, 109

[56] References Cited

U.S. PATENT DOCUMENTS

| | | | |
|---|---|---|---|
| 5,105,403 | 4/1992 | Kando et al. | 369/44.12 |
| 5,130,965 | 7/1992 | Karaki et al. | 369/112 |
| 5,161,139 | 12/1992 | Inoue et al. | 369/44.23 |
| 5,243,585 | 9/1993 | Hoshino et al. | 369/44.41 |
| 5,247,508 | 9/1993 | Tanaka | 369/112 |
| 5,270,996 | 12/1993 | Ono | 369/110 |
| 5,309,423 | 5/1994 | Noguchi et al. | 369/110 |

FOREIGN PATENT DOCUMENTS

| | | |
|---|---|---|
| 0228620 | 7/1987 | European Pat. Off. . |
| 0273356 | 7/1988 | European Pat. Off. . |
| 0457573 | 11/1991 | European Pat. Off. . |
| 62-217425 | 9/1987 | Japan . |
| 63-171438 | 7/1988 | Japan . |
| 41936 | 1/1992 | Japan . |

*Primary Examiner*—Loha Ben
*Attorney, Agent, or Firm*—Greer, Burns & Crain, Ltd.

[57] ABSTRACT

An optical data recording/reproducing device, wherein the number of reflection in an optical path of coherent light formed between a coherent light source and an optical disk is twice or a larger even number of times, and the array direction of the coherent light source and photodetectors is substantially parallel to the face of the optical disk, resulting in a smaller size in the direction corresponding to the thickness of the optical disk.

13 Claims, 16 Drawing Sheets

FIG. 3
(PRIOR ART)
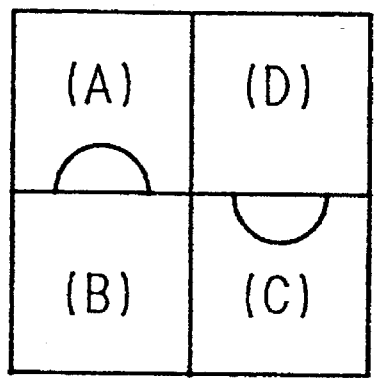
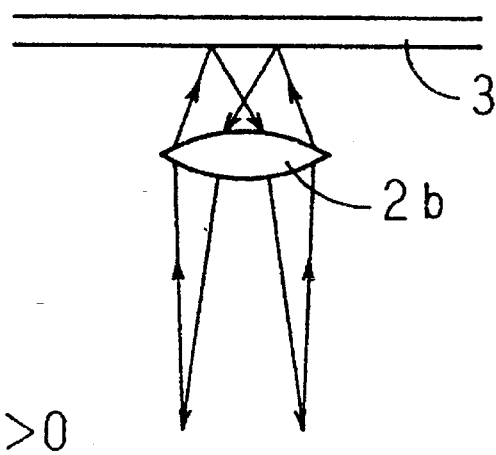
FES=(AA+CC)-(BB+DD)>0

FIG. 4
(PRIOR ART)
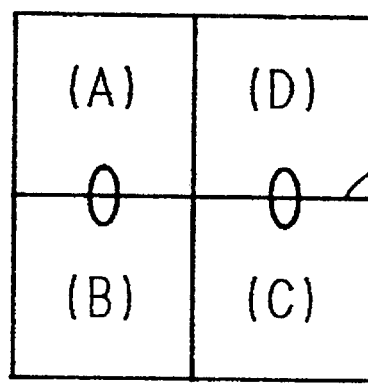
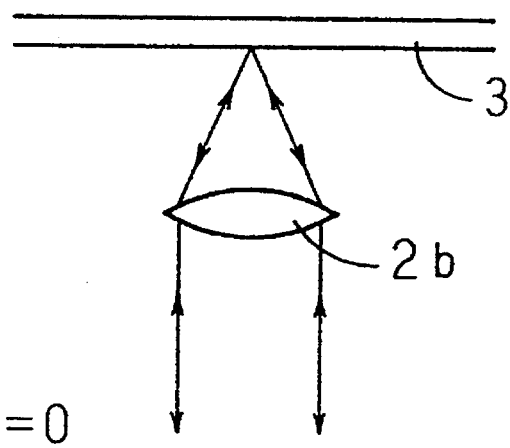
$FES=(AA+CC)-(BB+DD)=0$

FIG. 5
(PRIOR ART)
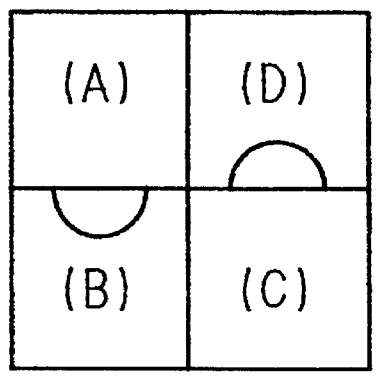 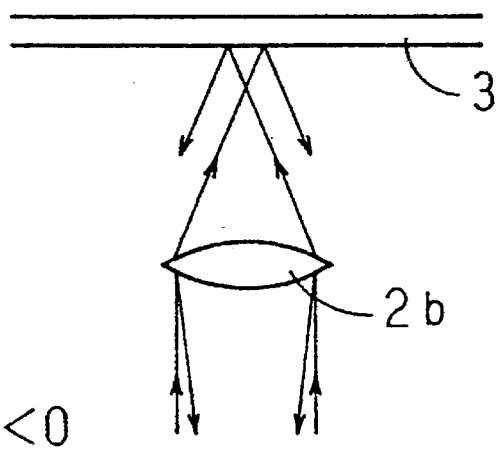
$FES=(AA+CC)-(BB+DD)<0$

FIG. 7
(PRIOR ART)
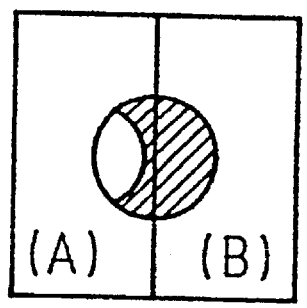
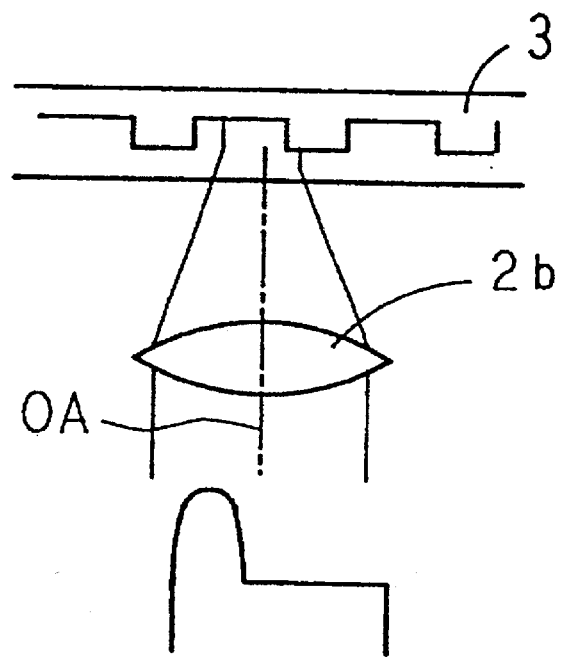

FIG. 8
(PRIOR ART)
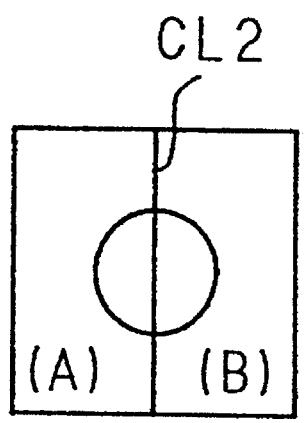
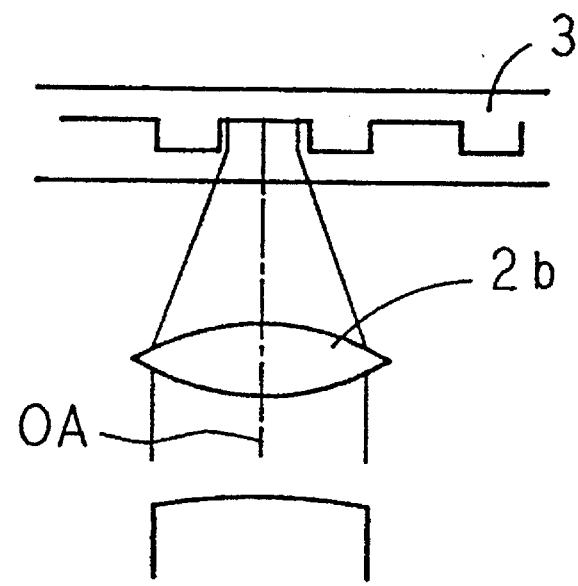

FIG. 9
(PRIOR ART)
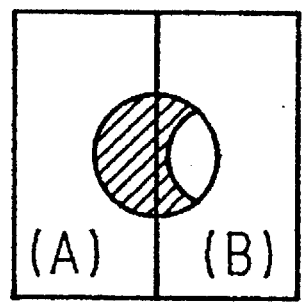
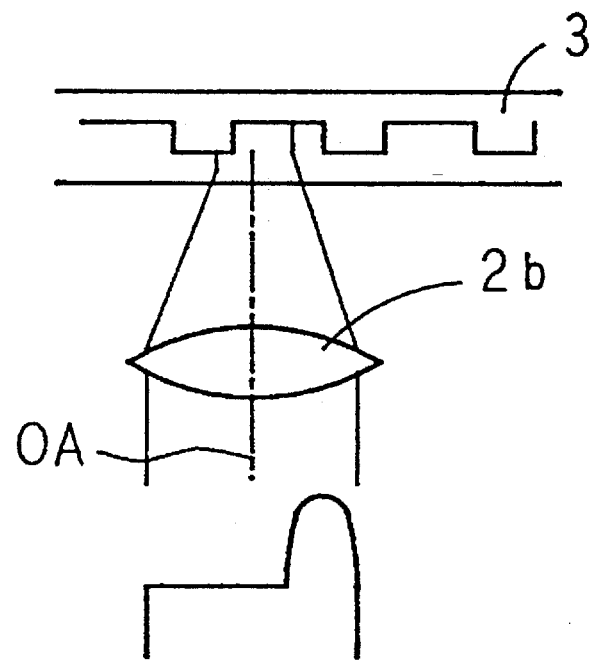

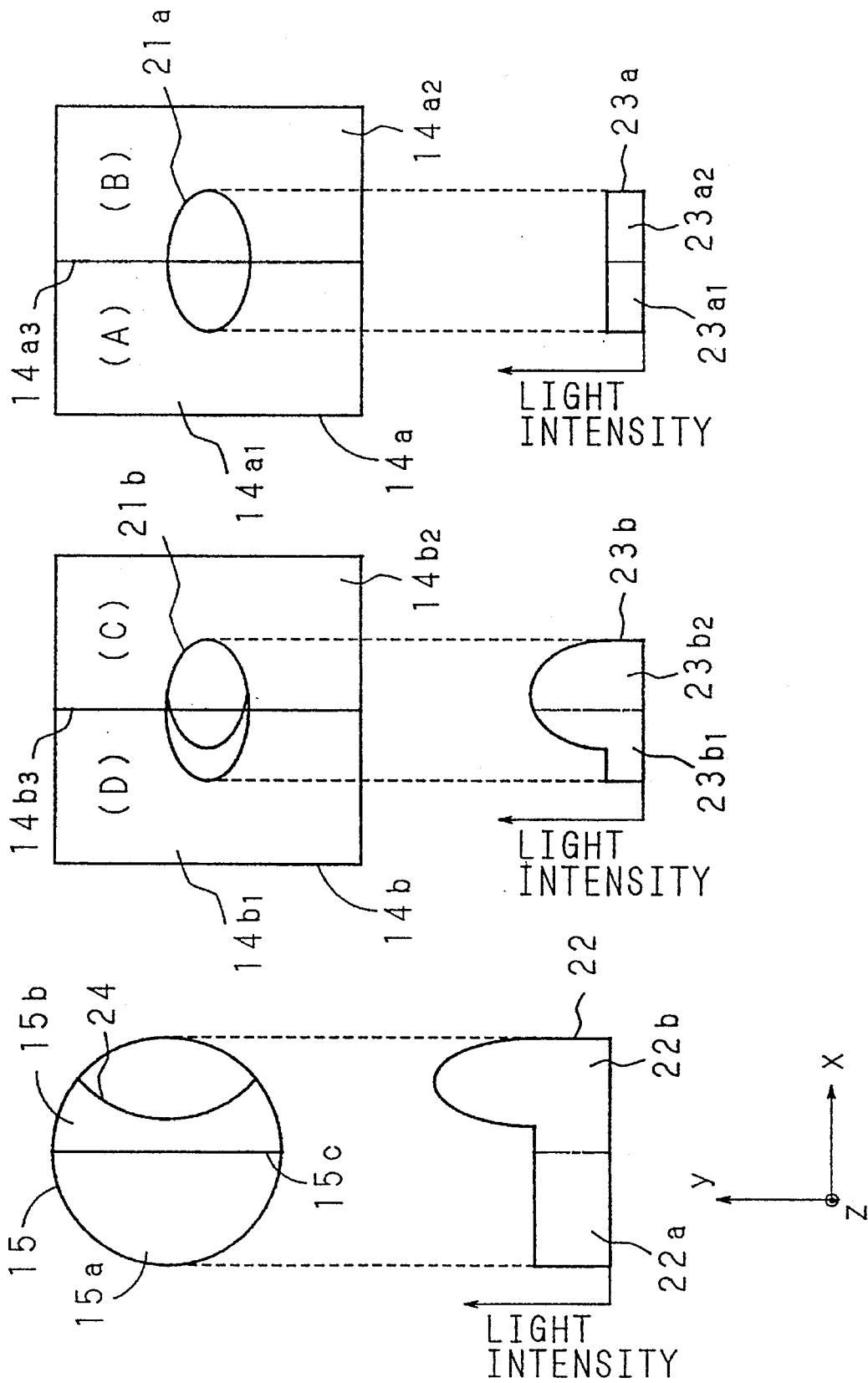

FIG. 13A
(PRIOR ART)
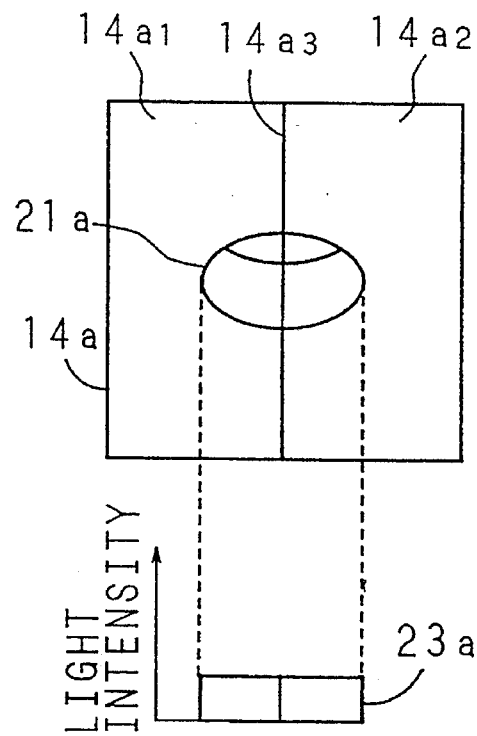
FIG. 13B
(PRIOR ART)
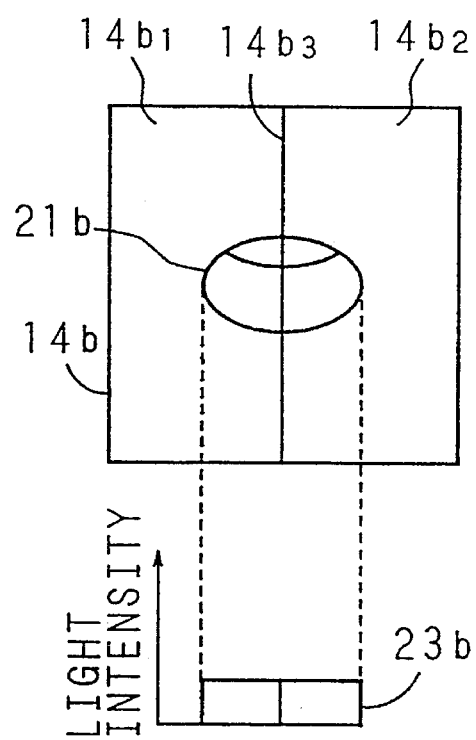
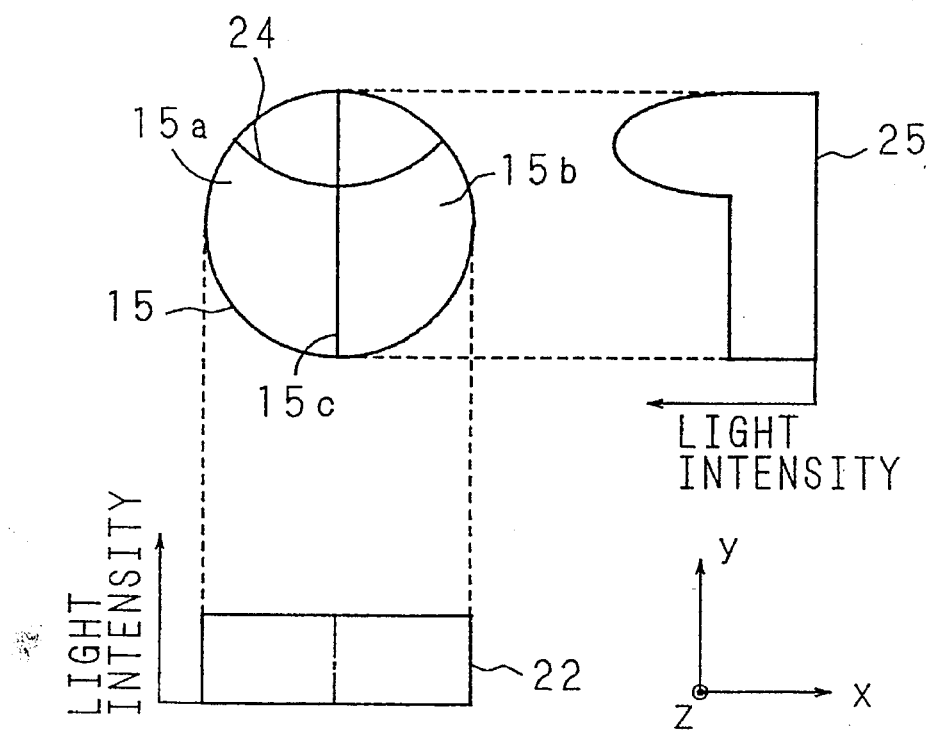
FIG. 13C
(PRIOR ART)

OPTICAL DATA RECORDING/REPRODUCING DEVICE AND INTEGRATED HEAD

BACKGROUND OF THE INVENTION

1. Field of the Invention

The present invention relates to an optical data recording/reproducing device for recording a data in and reproducing a data from an optical disk, and an integrated head containing a light source and photodetectors for the optical data recording/reproducing device.

2. Description of Related Art

As an optical head for writing a data in and reading data from an optical disk is generally used a separate optical type head, in which a movable unit having a minimum size and weight necessary for high speed access is separated from a fixed unit.

FIG. 1 is a schematic perspective view of a conventional separate optical type head. An optical disk 3 is mounted so as to rotate in a horizontal plane (i.e., the x–y plane). Below the optical disk 3 (i.e., in the negative direction of the z-axis) a movable unit 2 of the optical head is disposed movably along the positive and negative direction of the y-axis. An integrated head 1, which is part of a fixed unit of the optical head, is disposed away from the movable unit 2 in the positive direction of the y-axis (i.e., in the radial and centrifugal direction of the optical disk 3).

A coherent light source and photodetectors are built in the integrated head 1 as described below. The integrated head 1 projects a beam emitted by the light source in the negative direction of the y-axis, and the beam is reflected by a prism 2a of the movable unit 2 in the positive direction of the z-axis. The reflected beam is then converged by an objective lens 2b so as to be projected on the optical disk 3. The beam reflected by the optical disk 3 is allowed to proceed through the same optical path in the reverse direction to reach the integrated head 1. Rolling bearings 2d of the movable unit 2 are in contact with and roll on a rail 4 extending in the y-axis direction. A driving force to move the movable unit 2 in the y-axis direction is obtained by using a coil 2c provided to the movable unit 2 and a magnetic circuit 5 disposed in the direction of the y-axis so as to be combined with the coil 2c.

The main functions of the optical head include focus servo and track servo. The focus servo is a control for focusing a light beam on a recording surface of the optical disk 3, and the track servo is a control for allowing a focal point to track a desired track on the optical disk 3. The principles of such control will now be described. In the following description, it is assumed for simplification that the light source and the photodetectors are disposed below the optical disk 3 without using the prism 2a. FIG. 2 is an elevation view of such an optical head taken in the positive direction of the x-axis. A laser beam emitted by a laser diode 1a, the coherent light source, is projected through a holographic optical element 15 and the objective lens 2b onto the optical disk 3. A reflected beam from the optical disk 3 proceeds in the reverse direction and enters the holographic optical element 15 so as to be diffracted and deflected by a micro angle in accordance with a grating pattern formed on the holographic optical element 15. The thus deflected light enters photodiodes 14a, 14b, 14c and 14d that, are disposed, as the photodetectors, on the both sides of the laser diode 1a (i.e., along the positive and negative direction of the y-axis).

Before describing the focus servo using the holographic optical element 15, the principle of a Foucault method and a focus error signal FES used in the focus servo will be described first.

When the face of the optical disk 3 is deviated due to the rotation of the optical disk 3, the data recording film thereon is moved in the z-axis direction. A beam spot emitted through the objective lens 2b is servo-controlled so as to follow the movement and be always focused on a data recording film on the optical disk 3. For this servocontrol, a focus error signal (FES), whose output value is varied in accordance with a relative distance between the objective lens 2b and the optical disk 3, is used. An example of a method for obtaining the FES includes the Foucault method, in which one quartered photodiode or two halved photodiodes are used.

FIGS. 3 through 5 illustrate the relative distance between the optical disk and the objective lens together with a spot image formed on the photodiode, and FIG. 6 is a graph showing the relationship between the relative distance and the FES. When the optical disk is positioned at the focal point as is shown in FIG. 4, the reflected light from the optical disk forms elliptical spot images on a quartered photodiode 17, and the approximate center of the elliptical spot is located on a halving line CL1. The FES is obtained by using outputs AA, BB, CC and DD from the four regions A, B, C and D of the quartered photodiode as follows:

$$FES=(AA+CC)-(BB+DD)$$

When the light spot is correctly focused, the FES is 0.

When the optical disk is nearer than the focal point, the beam pattern is formed on the photodiode as two semicircles in the regions A and C as is shown in FIG. 3, and the value of the FES is positive in this case. When the optical disk is farther than the focal point, the beam pattern is formed as two semi-circles in the regions B and D as is shown in FIG. 5, and the value of the FES is negative in this case. In this manner, the output value of the FES is positive when the relative distance is short and negative when it is long, as is shown in FIG. 6. The focus servo can be realized by utilizing the FES having such a characteristic.

Next, the track servo will be described. When the optical disk is decentralized due to the rotation thereof, the track on the optical disk is shifted in the y-axis direction. Therefore, servo is required so that-the beam spot emitted through the objective lens 2b follows the shift of the track and is always focused on the track. For this purpose, a track error signal (TES), whose output value is varied in accordance with the relative distance between the beam spot and the track, is used. An example of methods for obtaining the TES includes a push-pull method, wherein a halved photodiode is used. FIGS. 7 through 9 illustrate the relative distance between the beam spot and the track together with a spot image formed on the photodiode, and a reflected light intensity distribution is also shown in each of the drawings. When a beam spot converged by the objective lens is positioned rightly on the track, the intensity distribution of the light reflected by the optical disk is symmetrical about an optical axis OA. The light intensity distribution on the halved photodiode is also symmetrical about a halving line CL2.

The TES is obtained by using outputs AA and BB of the regions A and B of the halved photodiodes as TES=AA–BB. When the beam spot is positioned on the track, the TES is 0. When the beam spot is shifted to the left of the track as is shown in FIG. 7, the intensity of the reflected light is higher on the left side of the optical axis OA. Therefore, also in the intensity distribution on the halved photodiode, the intensity on the left side of the halving line CL2 is higher, and the TES is positive in this case. When the beam spot is shifted to the right of the track as is shown in FIG. 9, the TES is negative. The track servo can be realized by using the TES having such a characteristic derived from the positive and negative shift of the beam spot. The beam pattern formed on the photodiode due to the rightward or leftward shift of the beam spot from the track is designated as a push-pull pattern.

Now, the methods for the focus servo and the track servo using the holographic optical element 15 shown in FIG. 2 will be described.

FIG. 10 is a schematic plan view of the optical head of FIG. 2 taken in the positive direction of the z-axis. The holographic optical element 15 is divided into two regions 15a and 15b in the y-axis direction so that the frequencies of the diffraction gratings in the regions 15a and 15b are different from each other: the former has a shorter frequency and the latter has a longer frequency. The halved photodiodes 14a and 14b are located so as to receive the +primary diffracted light from the regions 15a and 15b, respectively. Because of the length difference in the grating frequencies as mentioned above, the photodiode 14a is positioned farther in the y-axis direction than the photodiode 14b. Similarly, the halved photodiodes 14d and 14c are located so as to receive the —primary diffracted light from the regions 15a and 15b, respectively.

More specifically, the photodiode 14a is positioned as follows: The imaging point by the +primary diffracted light from the region 15a, which is obtained when the focal point is located on the optical disk 3, is located on a halving line $14a_3$ of the photodiode 14a. Similarly, the photodiode 14b is positioned so that the imaging point by the +primary diffracted light from the region 15b, which is obtained when the focal point is located on the optical disk 3, be located on a halving line $14b_3$ of the photodiode 14b. Under this condition, when the output of a region $14a_1$ of the halved photodiode 14a is taken as AA, the output of a region $14a_2$ as BB, the output of a region $14b_1$ of the photodiode 14b as DD, and the output of a region $14b_2$ as CC, the FES can be calculated as (AA+CC)−(BB+DD) on the basis of the Foucault method as described referring to FIGS. 3 through 6.

The halving lines on the photodiodes 14c and 14d receiving the −primary diffracted light extend in the x-axis direction. Each region of the photodiodes 14c and 14d receives the light at the intensity distribution as described referring to FIGS. 7 through 9, and hence, the TES can be calculated as AA−BB. Although one photodiode is sufficient for this purpose, two photodiodes connected in parallel can double the output, resulting in improving the quality of a signal to be outputted.

In conducting the focus servo and the track servo as described above, the halving lines $14a_3$ and $14b_3$ of the photodiodes 14a and 14b extend in the y-axis direction. Further, the push-pull patterns corresponding to the spot images on the photodiodes 14a and 14b are halved by the halving lines $14a_3$ and $14b_3$, respectively.

The reasons for the above will be described. First, the reason for the halving lines $14a_3$ and $14b_3$ extending in the y-axis direction is as follows: The oscillation wavelength of a laser beam emitted by the laser diode 1a is varied due to various causes. For example, when the recording/reproducing device is shifted from the reproducing operation to the recording operation, the power of the laser diode is generally increased from 4 through 5 mW to 27 through 30 mW. At this point, the wavelength of the laser diode is varied to be longer by approximately 2 through 5 nm. In the holographic optical element, since the light beam is deflected based on the principle of diffraction as is shown in FIG. 11A, the angle of diffraction increases from θ 0 to θ 1 when the wavelength becomes longer.

In accordance with this change of the angle of diffraction, an elliptic beam spot $21a_1$ formed on the photodiode 14a changes its position as a beam spot $21a_2$ as depicted in FIG. 11B. When the photodiode 14a is positioned so that the beam spot changes its position along the halving line $14a_3$, the light beam intensity at the regions $14a_1$ and $14a_2$ is not varied by this positional change of the beam spot. As a result, the value of the FES is not varied. When this positional change is made not parallel to the halving lines $14a_3$ and $14b_3$, however, the following problem occurs: When the beam spot changes its position due to the variation of the wavelength of the laser diode, the beam spot moves diagonally about the halving line $14a_3$, and the light beam intensity at the regions $14a_1$ and $14a_2$ is varied, thereby varying the value of the FES. As a result of the variation of the FES, the beam spot is defocused. This also goes for the photodiode 14b.

Next, the reason for the push-pull pattern corresponding to the spot image on the photodiode being vertically halved by the halving line is as follows:

FIGS. 12A, 12B and 12C illustrate the relationship between the halving lines of the holographic optical element and the photodiodes and the push-pull pattern. In FIG. 12A, a halving line 15c of the holographic optical element 15 is substantially parallel to a push-pull pattern 24. In this case, the tracking direction is parallel to the y-axis. A reference numeral 22 denotes an intensity distribution in the x-axis direction of reflected light from the optical disk 3 entering the holographic optical element 15. The distribution 22 is obtained when the track is shifted in the positive direction of the x-axis from the beam spot. The light having entered the holographic optical element 15 is halved by the halving line 15c. Light diffracted in the region 15a as described above is converged on the photodiode 14a as a beam spot. 21a depicted in FIG. 12C. At this point, a light intensity distribution 23a in the positive direction of the x-axis is equally divided as is shown as portions $23a_1$ and $23a_2$ in FIG. 12C.

Further, light beam diffracted in the region 15b is converted on the photodiode 14b as a beam spot 21b as depicted in 12B. A light intensity distribution 23b in the positive direction of the x-axis in this case is not equally divided as is shown as portions $23b_1$ and $23b_2$ (i.e., $23b_1 > 23b_2$). When the outputs of the regions $14a_1$, $14a_2$, $14b_2$ and $14b_2$ and $14b_1$ are taken as AA, BB, CC and DD, respectively, the following relationship holds:

$23b_2 > 23b_1 > 23a_1 = 23a_2$

∴ $CC > DD > A = BB$

∴ $FES = (AA + CC) − (BB + DD) > 0$

Therefore, the value of the FES is not 0. This means that an offset is caused in the FES, resulting in causing the defocus of the beam spot. Accordingly, such a configuration is inappropriate.

FIGS. 13A, 13B and 13C illustrate another relationship between the halving lines of the holographic optical element and the photodiodes and the push-pull pattern, in which the halving line 15c of the holographic optical element 15 is vertical to the push-pull pattern 24 as depicted in FIG. 13C.

In this case, the tracking direction is parallel to the x-axis direction. The reference numeral 22 denotes an intensity distribution in the x-axis direction of reflected light from the optical disk entering the holographic optical element 15. This distribution is obtained when the track is shifted in the positive direction of the y-axis from the beam spot. A reference numeral 25 denotes an intensity distribution in the y-axis direction of the reflected light from the optical disk entering the holographic optical element 15. The light beam that has entered the holographic optical element 15 is halved by the halving line 15c.

The light beam diffracted in the region 15a is converged on the photodiode 14a as the beam spot 21a as described above and depicted in FIG. 13A. The light intensity distribution in the x-axis direction obtained in this case is uniform as is shown as the distribution 23a. The light beam diffracted in the region 15b is converged on the photodiode 14b as the beam spot 21b depicted in FIG. 13B. The light intensity distribution in the x-axis direction in this case is uniform as is shown as the distribution 23b. Under this condition, when the outputs of the regions $14a_1$, $14a_2$, $14b_2$ and $14b_1$ are taken as AA, BB, CC and DD, the following relationship holds:

$$23b_1=23a_1=23a_2=23b_2$$

$$\therefore AA=BB=CC=DD$$

$$\therefore FES=(AA+CC)-(BB+DD)=0$$

Thus, the FES takes a value of 0 in this case. This means that neither offset is caused in the FES nor defocus is caused in the beam spot.

As is apparent from the above, in the case where the beam spot is shifted rightward or leftward from the track and the resultant intensity variation of the push-pull pattern is superimposed on the reflected light from the optical disk, neither an offset is caused in the FES nor the beam spot is defocused, if the holographic optical element 15 is disposed with the halving line 15c vertical to the push-pull pattern. In other words, when the holographic optical element 15 is thus disposed, the FES is not disturbed by a push-pull signal.

Considering the above-described fact, it is necessary to allocate the laser diode 1a and the photodiodes 14a, 14b, 14c and 14d shown in FIG. 2 in the y-axis direction so that the halving lines of the photodiodes 14a and 14b for the FES be vertical to the push-pull pattern. In the description referring to FIG. 2, however, it is assumed that the optical source and the photodetectors are both disposed below the optical disk. Therefore, the laser diode 1a and the photodiodes 14a, 14b, 14c and 14d are actually allocated in the z-axis direction as is shown in FIG. 1. When these elements are disposed in this manner, the size of the data recording/reproducing device corresponding to the thickness direction of the optical disk tends to be large. An attempt to minimize the size of the device in the z-axis direction has been a technical problem in common, regardless of the mounting direction of the optical disk.

SUMMARY OF THE INVENTION

The present invention was devised to overcome the aforementioned problem, and one objective of the invention is to provide an optical data recording/reproducing device and an integrated head in which the number of reflection in an optical path is increased and the array direction of a coherent light source and photodetectors is substantially parallel to the face of an optical disk, thereby decreasing the size of the optical data recording/reproducing device in the direction corresponding to the thickness of the optical disk.

It is characterized in that the optical data recording/reproducing device of this invention comprises a coherent light source for emitting coherent light; optical means for allowing reflected light of the coherent light from an optical disk to form a first optical path substantially vertical to the face of the optical disk and a second optical path including an even number of reflection; a holographic optical element that transmits the reflected light having passed through the optical means; and photodetectors for receiving the reflected light via the holographic optical element. The second optical path is disposed in a plane substantially parallel to the face of the optical disk. Further, the direction of the reflection in the second optical path subsequent to the first optical path is parallel to a tangent line at a projecting point on the optical disk. Moreover, the array direction of the coherent light source and the photodetectors is substantially parallel to the face of the optical disk. Further, a projecting optical path from the coherent light source to the optical disk is substantially identical to the second optical path and the first optical path. It is characterized in that the optical means includes two mirrors for the reflection in the second optical path. Furthermore, the optical means includes a prism having two mirror faces for the reflection in the second optical path.

Accordingly, two or a larger even number times of reflection is performed so that the array direction of the coherent light source and the photodetectors is parallel to the face of the optical disk, that is, the direction corresponding to the thickness of the optical disk and a substantially vertical direction to the radial direction of the optical disk. As a result, the data recording/reproducing device can attain a smaller size in the direction corresponding to the thickness of the optical disk. Specifically, as the number of the reflection in the second optical path, two, which is the minimum number, is sufficient for the purpose.

The integrated head of this invention comprises a coherent light source for emitting coherent light and photodetectors for receiving reflected light of the coherent light from an optical disk that has passed through a first optical path substantially vertical to the face of the optical disk and a second optical path including an even number of reflection. The array direction of the coherent light source and the photodetectors is substantially parallel to the face of the optical disk.

Therefore, also the integrated head can attain a smaller size in the direction corresponding to the thickness of the optical disk. The above and further objects and features of the invention will more fully be apparent from the following detailed description with accompanying drawings.

BRIEF DESCRIPTION OF THE DRAWINGS

FIG. 3 is an explanatory drawing for a conventional focus error signal;

FIG. 4 is another explanatory drawing for the conventional focus error signal;

FIG. 5 is still another explanatory drawing for the conventional focus error signal;

FIG. 7 is an explanatory drawing for a conventional track error signal;

FIG. 8 is another explanatory drawing for the conventional track error signal;

FIG. 9 is still another explanatory drawing for the conventional track error signal;

FIGS. 12A, 12B and 12C show the relationship between a push-pull pattern and the photodiodes in the conventional optical data recording/reproducing device;

FIGS. 13A, 13B and 13C show another relationship between the push-pull pattern and the photodiodes;

DESCRIPTION OF THE PREFERRED EMBODIMENTS

The present invention will now be described referring to the accompanying drawings illustrating the embodiments thereof.

Figure 1:
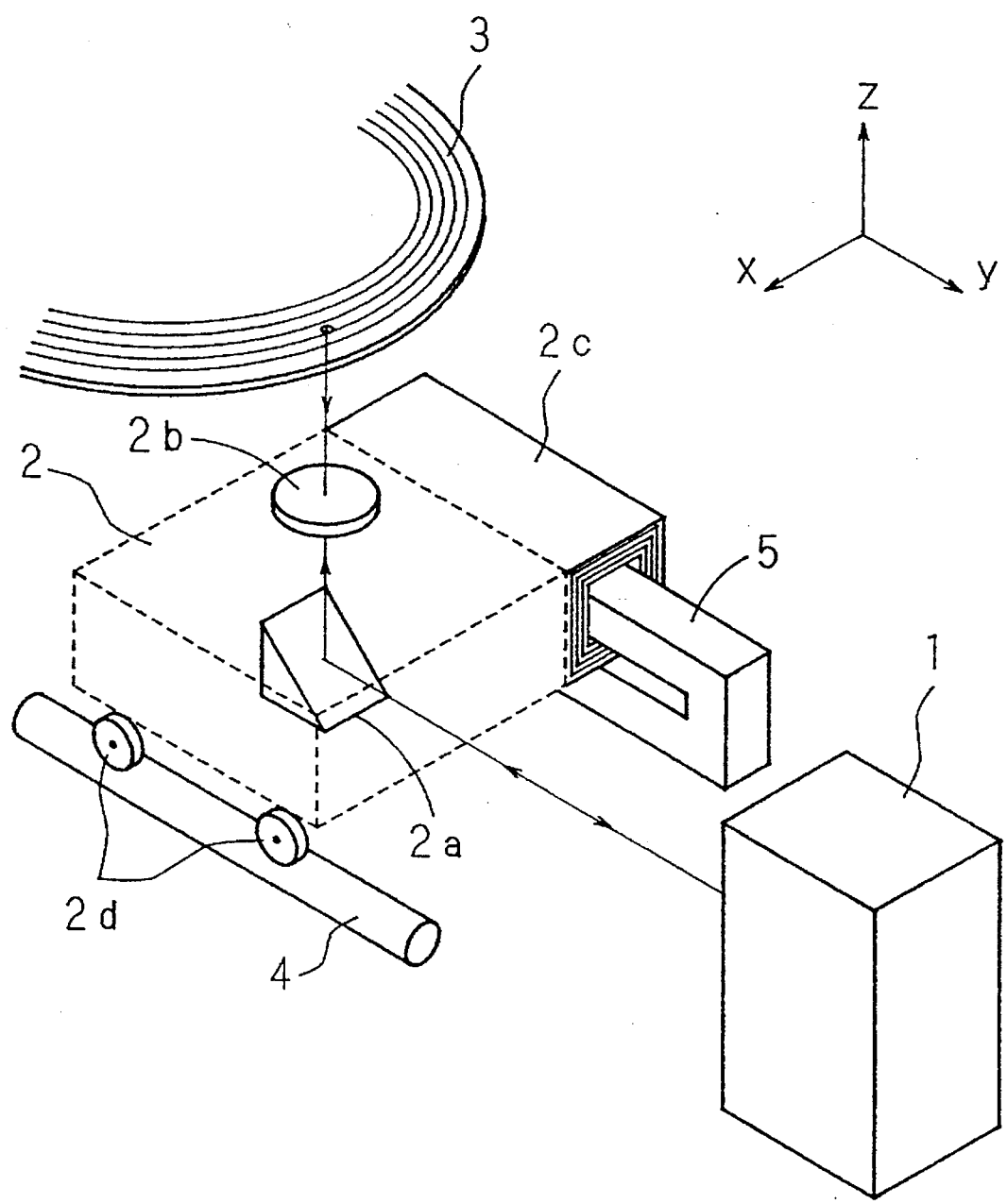
FIG. 1 is a schematic perspective view of a conventional optical data recording/reproducing device.
Figure 2:
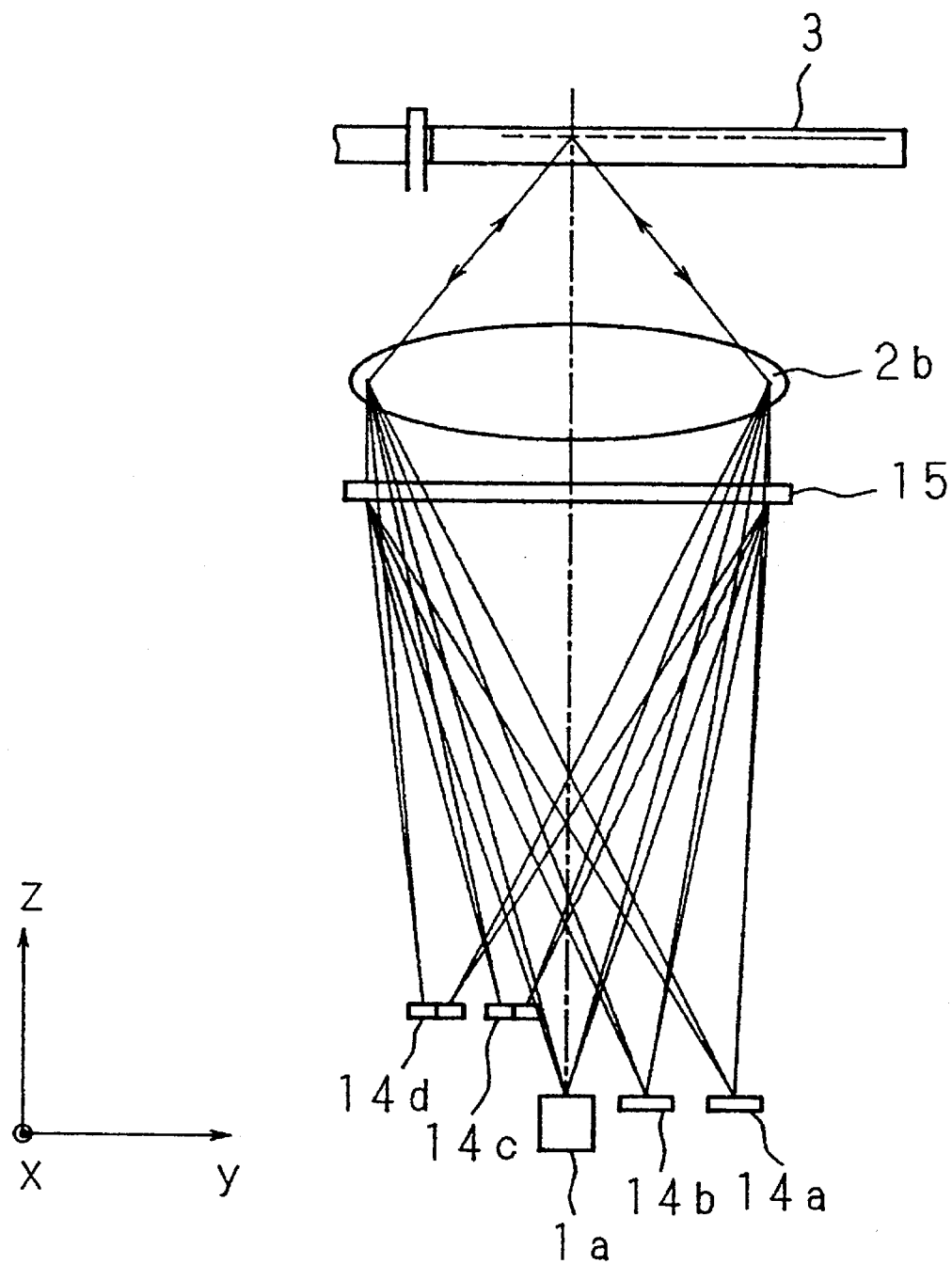
FIG. 2 is a diagram of an optical system in the conventional optical data recording/reproducing device.
Figure 6:
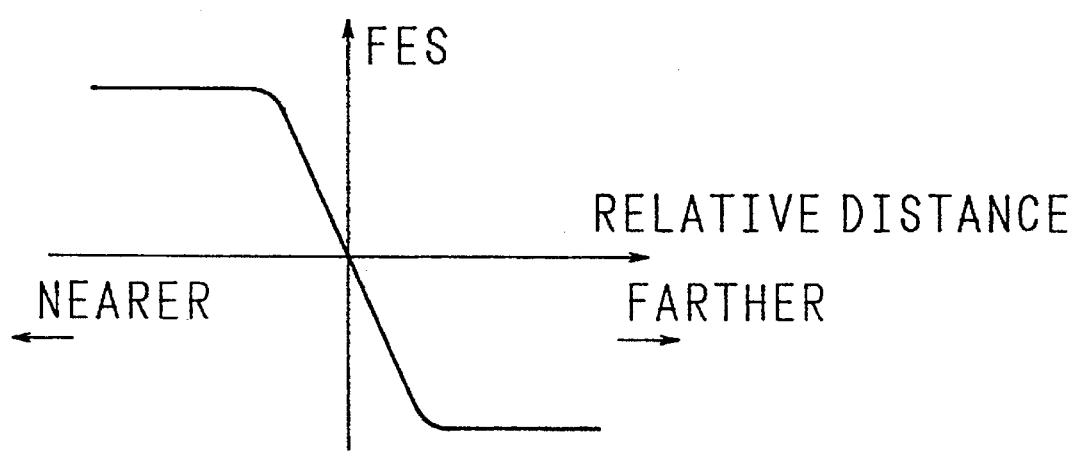
FIG. 6 is still another explanatory drawing for the conventional focus error signal.
Figure 10:
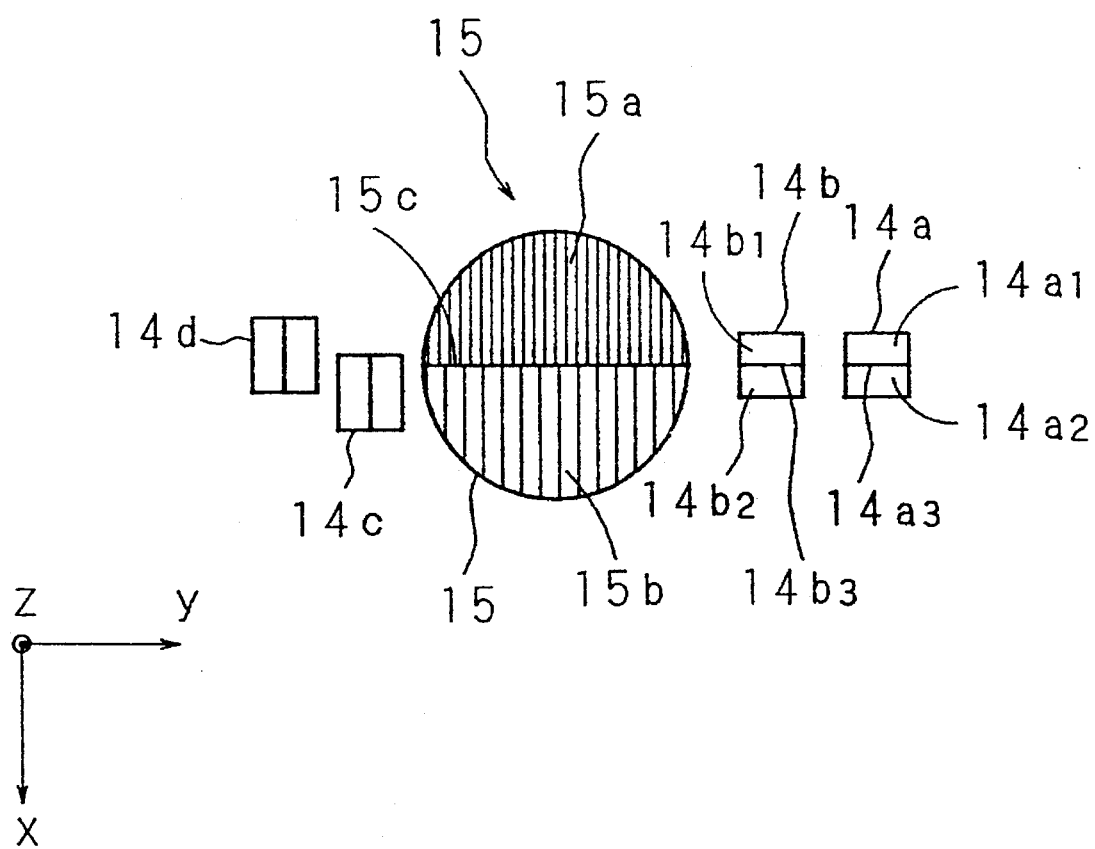
FIG. 10 is a layout diagram of a holographic optical element and photodiodes in the conventional optical data recording/reproducing device.
Figures 11A, 11B:
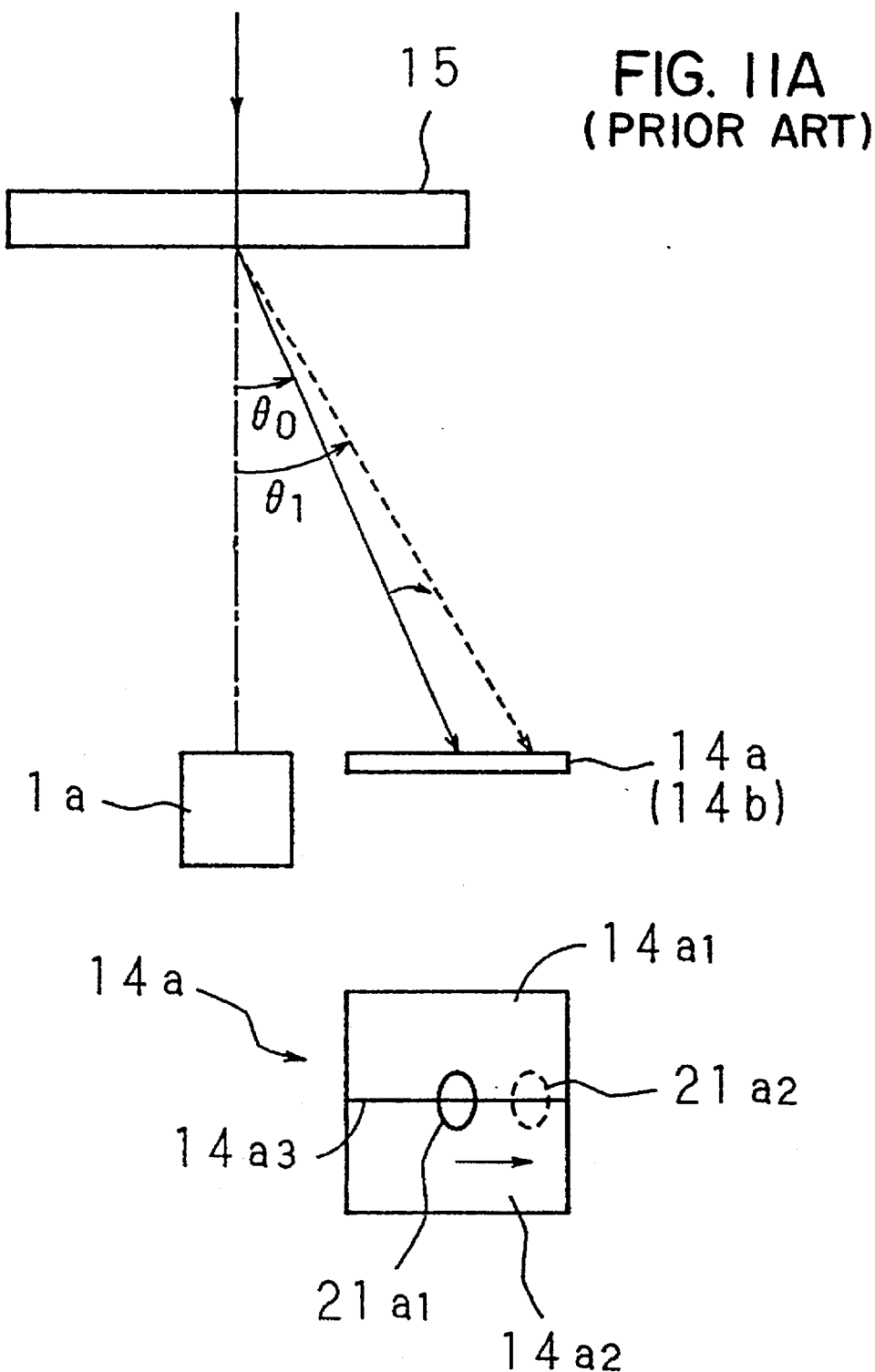
FIGS. 11A and 11B illustrates diffraction by the conventional holographic optical element of FIG. 10.
Figure 14:
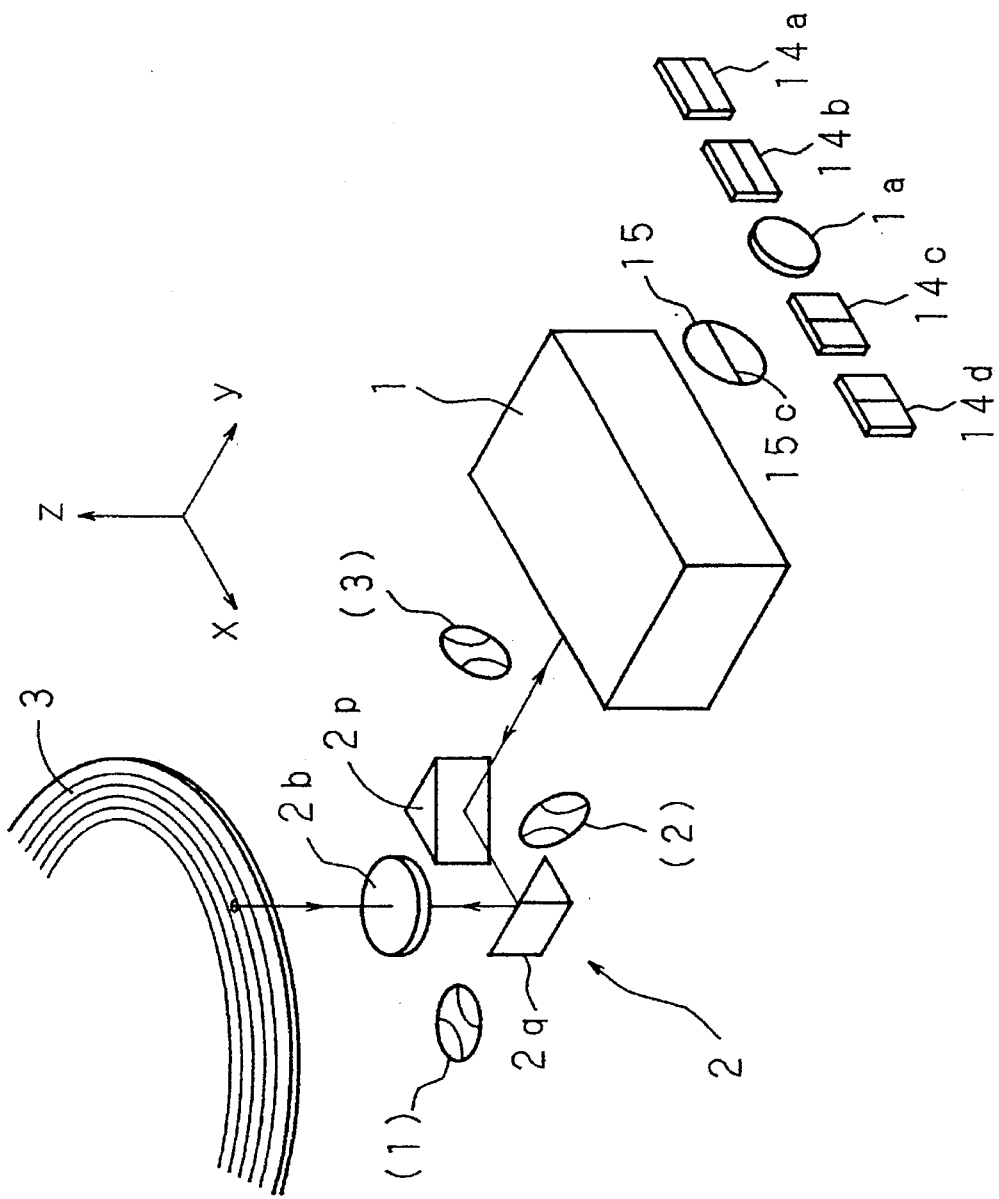
FIG. 14 is a schematic perspective view of an optical data recording/reproducing device of the invention.

FIG. 14 is a diagram showing an optical data recording/reproducing device according to one embodiment of the invention.

An optical disk 3 is mounted in the x–y plane so as to rotate around the z-axis. Below the optical disk 3 (i.e., in the negative direction of the z-axis) is disposed a movable unit 2 so as to move in the y-axis direction. The movable unit 2 includes an objective lens 2b, a prism 2q that is disposed right beneath the objective lens 2b and changes the direction of an optical path from the z-axis direction to the x-axis direction, and a prism 2p that changes the direction of the optical path from the x-axis direction to the y-axis direction. The movable unit 2 further includes mechanisms for the focus servo and the track servo (not shown).

In the vicinity of all integrated head 1, that is, part of a fixed unit, a laser diode 1a and photodiodes 14a, 14b, 14c and 14d are disposed so that the laser diode la be positioned at the center with the photodiodes 14c and 14d in the positive direction of the x-axis and the photodiodes 14b and 14a in the negative direction of the x-axis. All the photodiodes are halved photodiodes, and the photodiodes 14c and 14d are disposed with their halving lines in the z-axis direction and the photodiodes 14b and 14a with their halving lines in the x-axis direction. Between the laser diode 1a and the integrated head 1 is provided a holographic optical element 15, whose halving line 15c extends in the x-axis direction.

Although all the optical elements are generally contained in a cylindrical body of the integrated head 1, the cylindrical body is omitted in FIG. 14.

Light reflected by the optical disk 3 in such an optical data recording/reproducing device of the invention will be described. In a first optical path from the optical disk 3 to the prism 2q through the objective lens 2b, a push-pull pattern appears in the y-axis direction in the x–y plane as is shown with a reference numeral (1) in FIG. 14. In a second optical path, which extends in the x-axis direction, of the light, reflected by the prism 2q, a push-pull pattern appears in the y-axis direction in the y–z plane as is shown with a reference numeral (2), which extends toward the integrated head 1, of the light reflected by the prism 2p, a push-pull pattern appears in the x-axis direction in the z-x plane as is shown with a reference numeral (3). This means that a halving line 15c of the holographic optical element 15 and the direction of the push-pull pattern thereon satisfy the relationship illustrated by FIG. 13, and that the halving lines of the photodiodes 14a and 14b and the push-pull pattern also satisfy the relationship illustrated by FIG. 13.

Since the halving line 15c of the holographic optical element 15 extends in the x-axis direction, it goes without saying that the ±primary diffracted light from the two regions of the holographic optical element 15 spreads in the x-axis direction so as to be received by the photodiodes 14a, 14b, 14c and 14d disposed in the x-axis direction.

Figure 15:
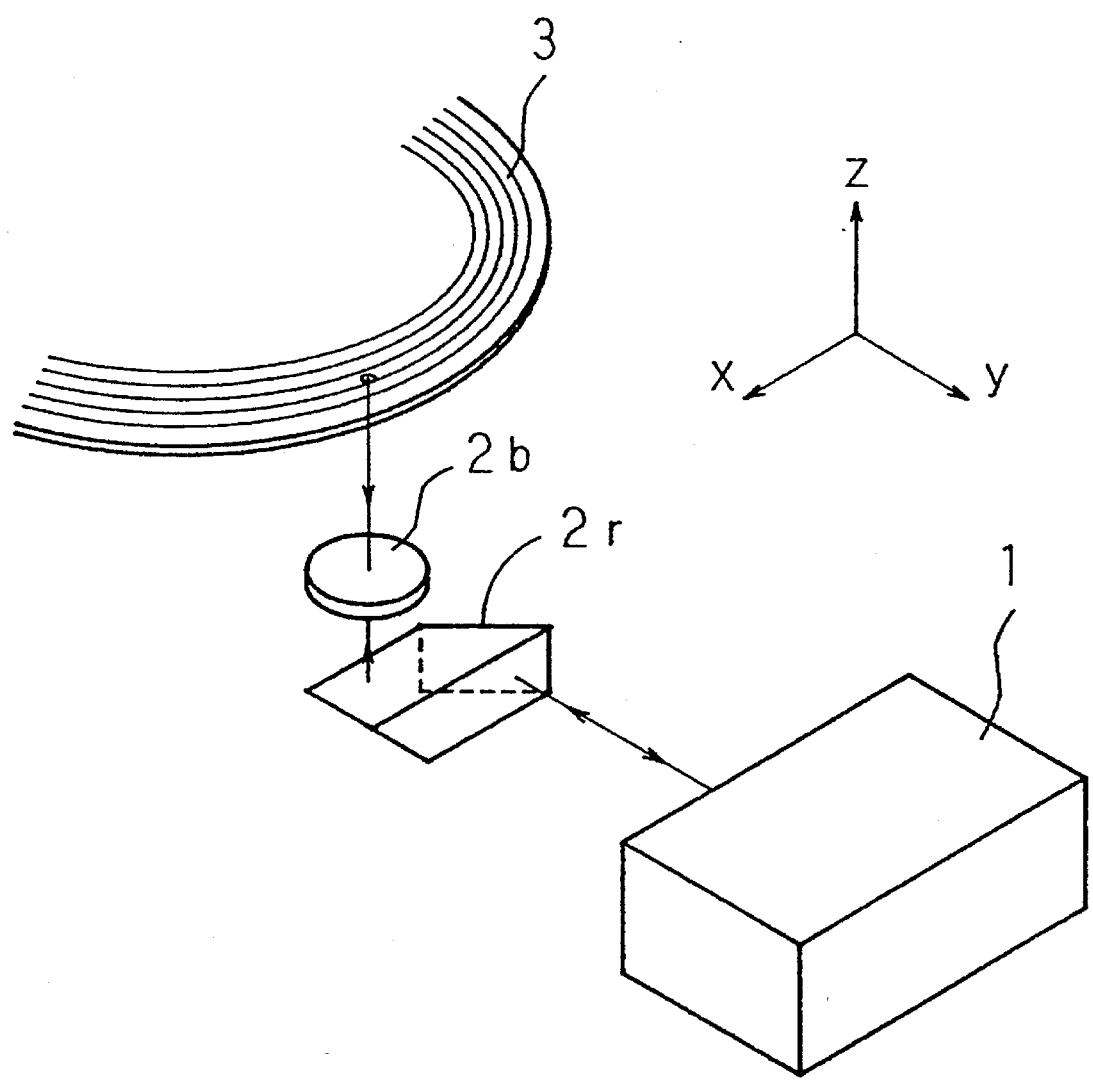
FIG. 15 is a schematic perspective view of another optical data recording/reproducing device of the invention.

FIG. 15 is a perspective view of the optical data recording/reproducing device according to another embodiment of the invention, in which a second optical path of the light reflected by an optical disk 3 is reflected twice by using two reflecting faces of a prism 2r. An integrated head 1 and optical elements therein are disposed in the same manner as shown in FIG. 14, and hence the description thereof is omitted.

Figure 16:
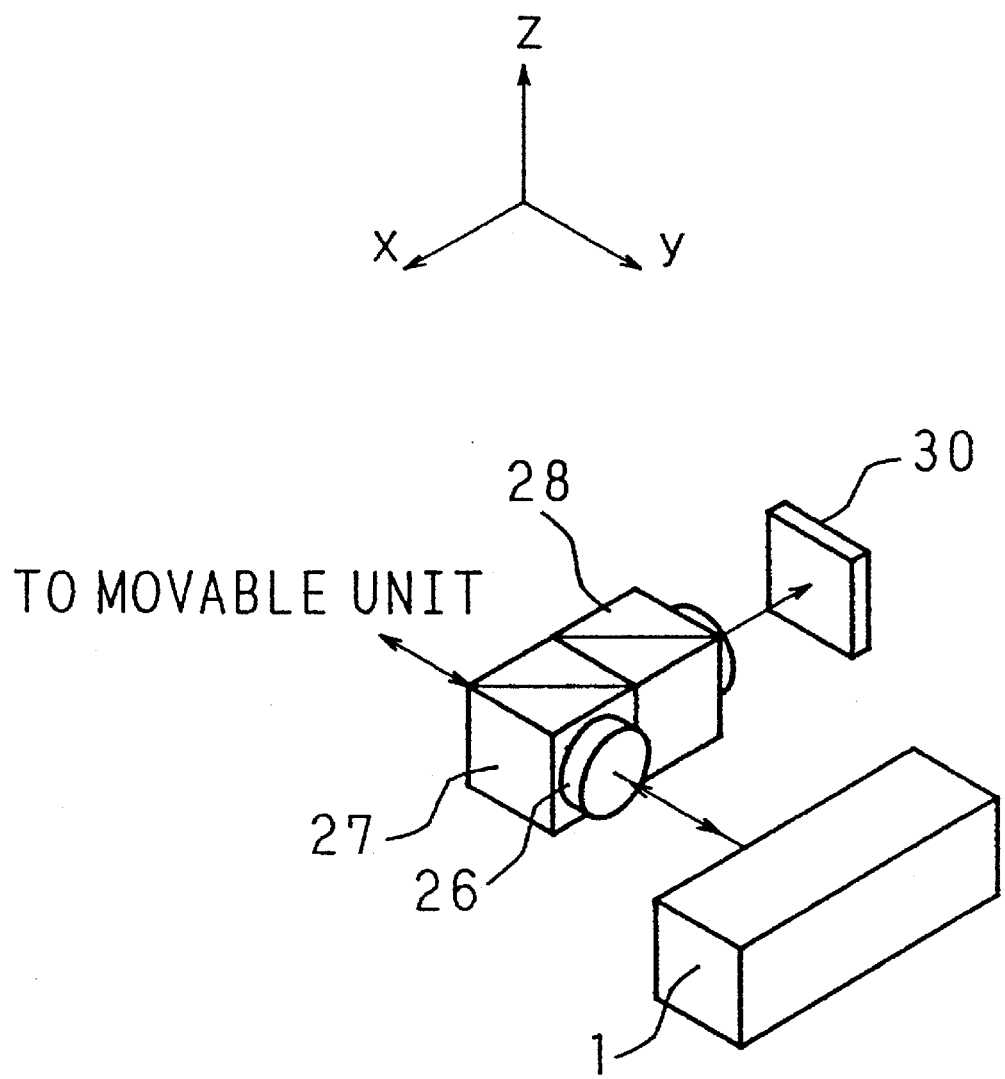
FIG. 16 is a detailed perspective view of a fixed unit in the optical data recording/reproducing device of the invention.

FIG. 16 is a detailed perspective view of the fixed unit commonly used in the aforementioned two embodiments. Light emitted from the integrated head 1 is made into a parallel beam by a collimate lens 26, and the parallel beam enters the movable unit through a beam splitter 27. Reflected light from the optical disk 3 proceeds toward the integrated head 1 in the reverse direction, and also proceeds in the negative direction of the x-axis owing to the beam splitter 27 and is separated into p-polarized light and s-polarized light by a Wollaston prism 28 so as to enter a halved photodiode 30. A data recorded in the optical disk is thus read through the photodiode 30.

According to the present invention, the array direction of a coherent light source and photodetectors is substantially the face of an optical disk. Therefore, the optical data recording/reproducing device can attain a smaller size in the direction corresponding to the thickness of the optical disk. Also, the size of the integrated head in the direction corresponding to the thickness of the optical disk can be minimized.

A conventionally used prism is required to have extremely high accuracy in its reflecting face. Specifically, the conventional prism requires an expensive dielectric film having an extremely large number of layers so as to attain a small phase difference between p-polarized light and s-polarized light. In the present invention, however, the number of times of reflection is twice or a larger even number of times. Therefore, the accuracy in each reflecting face is not required to be very high. Specifically, the phase difference is canceled through the reflection, resulting in increasing an allowable range of the phase difference. Thus, a required number of the layers of the film on the prism can be decreased. Accordingly, although a number of reflecting faces are used, the production cost can be decreased.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An optical data recording/reproducing device which control focusing of coherent light projected on an optical disk, comprising: a coherent light source for emitting the coherent light; optical means for allowing reflected light of the coherent light from the optical disk to form a first optical path that is substantially vertical to a face of the optical disk and a second optical path that includes an even number of reflection,, said first optical path and said second optical path being substantially identical to a projecting optical path from the coherent light source to the optical disk;

a holographic optical element that transmits said reflected light having passed through said optical means; and photodetectors for receiving said reflected light via said holographic optical element, thereby obtaining a pattern of said reflected light to be used for controlling focusing of the coherent light projected on the optical disk.

2. An optical data recording/reproducing device according to claim 1, wherein said second optical path is disposed in a plane substantially parallel to the face of said optical disk.

3. An optical data recording/reproducing device according to claim 2, wherein an array direction of said coherent light, source and said photodetectors is substantially parallel to the face of said optical disk.

4. An optical data recording/reproducing device according to claim 2, wherein the number of the reflection in said second optical path is two.

5. An optical data recording/reproducing device according to claim 1, wherein a reflecting direction in said second optical path subsequent to said first optical path is substantially parallel to a tangent line at a projecting point of said coherent light-on said optical disk.

6. An optical data recording/reproducing device according to claim 5, wherein an array direction of said coherent light source and said photodetectors is substantially parallel to the face of said optical disk.

7. An optical data recording/reproducing device according to claim 5, wherein the number of the reflection in said second optical path is two.

8. An optical data recording/reproducing device according to claim 1, wherein an array direction of said coherent light source and said photodetectors is substantially parallel to the face of said optical disk.

9. An optical data recording/reproducing device according to claim 8, wherein the number of the reflection in said second optical path is two.

10. An optical data recording/reproducing device according to claim 1, wherein the number of reflection in said second optical path is two.

11. An optical data recording/reproducing device according to claim 1, wherein said optical means includes two mirrors for the reflection in said second optical path.

12. An optical data recording/reproducing device according to claim 1, wherein said optical means includes a prism having two mirror faces for the reflection in said second optical path.

13. An integrated head included in an optical data recording/reproducing device which controls focusing of coherent light projected on an optical disk, comprising:

a coherent light source for emitting the coherent light; and photodetectors disposed to receive reflected light of the coherent light from the optical disk that has passed through a first optical path substantially vertical to a face of the optical disk and a second optical path including an even number of reflection, so as to obtain a pattern of said reflected light to be used for controlling focusing of the coherent light projected on the optical disk, said first optical path and said second optical path being substantially identical to a projecting optical path from the coherent light source to the optical disk, wherein an array direction of the coherent light source and said photodetectors is substantially parallel to the face of the optical disk.

* * * * *

UNITED STATES PATENT AND TRADEMARK OFFICE
CERTIFICATE OF CORRECTION

PATENT NO. : 5,600,618
DATED : February 4, 1997
INVENTOR(S) : Tezuka et al.

Page 1 of 2

It is certified that error appears in the above-indentified patent and that said Letters Patent is hereby corrected as shown below:

Column 4, line 49, delete "and $14b_2$".

Column 4, line 55, delete "∴CC>DD>A=BB" and insert --∴CC>DD>AA=BB--.

Column 7, line 46, delete "all" and insert --an--.

Column 7, line 48, delete "la" and insert --1a--.

Column 9, line 7, after "comprising:", start a new paragraph.

UNITED STATES PATENT AND TRADEMARK OFFICE
CERTIFICATE OF CORRECTION

PATENT NO. : 5,600,618
DATED : February 4, 1997
INVENTOR(S) : Tezuka et al.

It is certified that error appears in the above-indentified patent and that said Letters Patent is hereby corrected as shown below:

Column 9, line 8, after "coherent light;", start a new paragraph.

Column 9, line 12, delete "reflection,," and insert --reflection,--.

Column 9, line 26, delete "light," and insert --light--.

Column 9, line 36, delete "light-on" and insert --light on--.

Signed and Sealed this

Seventh Day of October, 1997

Attest:

BRUCE LEHMAN

*Attesting Officer*      *Commissioner of Patents and Trademarks*